B. J. EGAN.
RESILIENT SUSPENSION FOR THE BODIES OF VEHICLES.
APPLICATION FILED MAY 22, 1913.

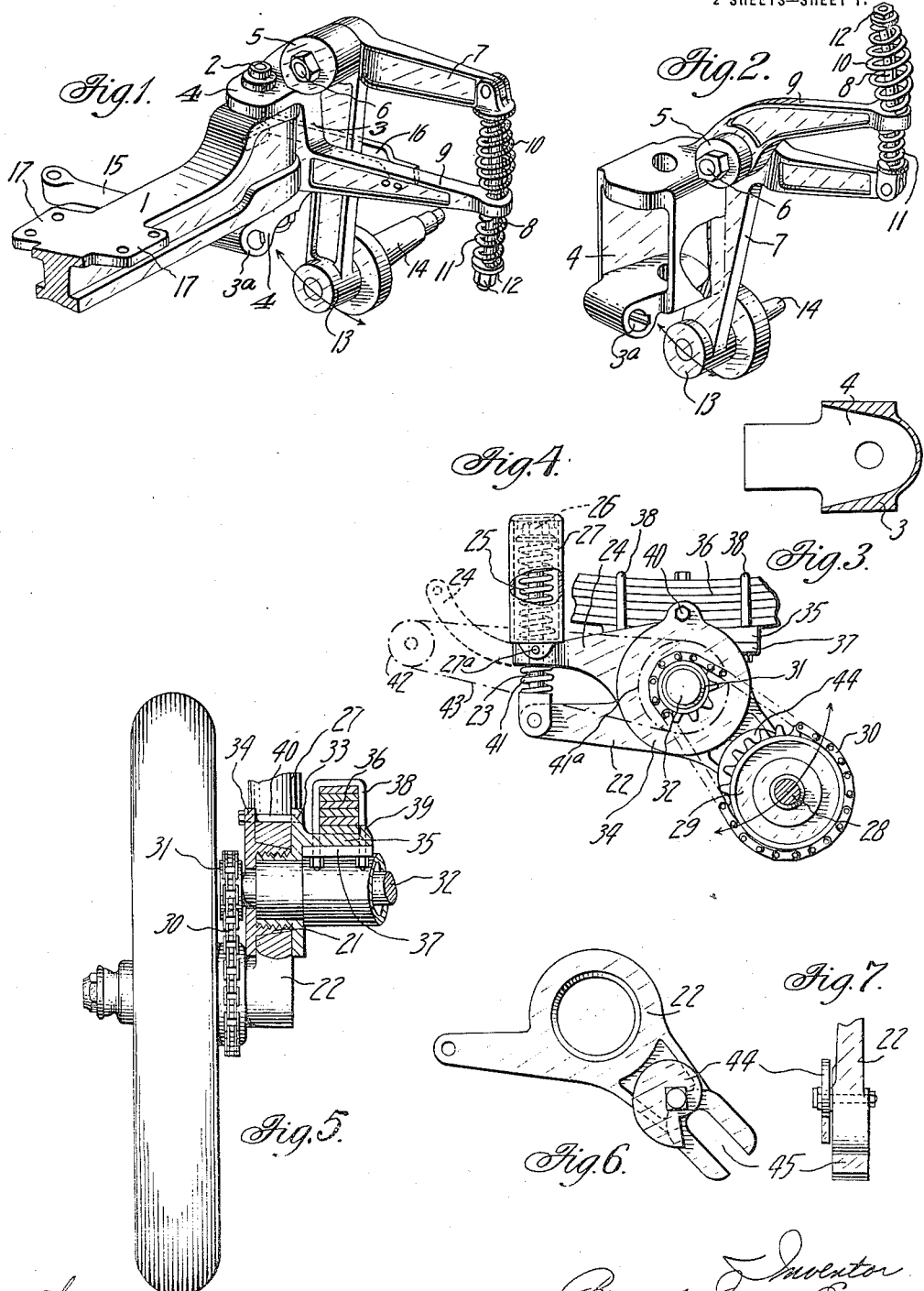

1,177,237.

Patented Mar. 28, 1916.
2 SHEETS—SHEET 2.

UNITED STATES PATENT OFFICE.

BERNARD JAMES EGAN, OF SWAN HILL, VICTORIA, AUSTRALIA.

RESILIENT SUSPENSION FOR THE BODIES OF VEHICLES.

1,177,237.  Specification of Letters Patent.  Patented Mar. 28, 1916.

Application filed May 22, 1913. Serial No. 769,346.

*To all whom it may concern:*

Be it known that I, BERNARD JAMES EGAN, of Swan Hill, in the State of Victoria, Commonwealth of Australia, blacksmith, have invented certain new and useful Improvements in Resilient Suspensions for the Bodies of Vehicles, of which the following is a specification.

This invention relates to an improved resilient suspension for the bodies of vehicles and has been devised in order to provide more efficient means of absorbing or minimizing the shock and jar incident to the wheels encountering an obstacle on or rut in the roadway than any at present in use and known to me.

It is known that when a vehicle is moving rapidly on a roadway and the wheels strike an obstacle or enter a rut the force of impact is transmitted rearwardly in a line between the horizontal and vertical and that the direction the line of force takes will vary according to the rate at which the vehicle is propelled and the size of the obstacle or rut. Thus broadly speaking the faster the vehicle is propelled the nearer will the line of force approach the horizontal while when traveling very slowly the line of force may be directed nearly vertically.

The difficulty experienced with the ordinary forms of suspension devices is that they permit of practically only a vertical movement of the vehicle body and consequently do not take up the greater part of the shock or vibration occasioned by the wheels being brought into forcible contact with an obstacle or rut. These shocks or jars are occasioned more particularly by the front wheels striking an obstacle or entering ruts and is due to the fact that the whole weight of the vehicle is located behind the same at the moment of impact.

Now the present invention embodies novel features of construction which will obviate or greatly minimize the above mentioned difficulty and will take up all shocks and jars more or less in the direction of the force of impact.

The main principle underlying the invention is embodied in certain features of construction which will permit of the wheels of a vehicle having a backward movement in opposition to the action of resilient members as compression springs or the like and preferably in the direction taken by the line of force incident to the wheels striking an obstacle on or rut in a roadway.

Figure 8:
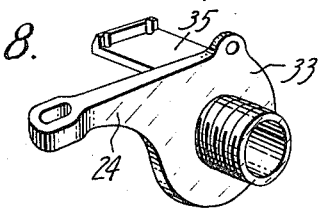
Figure 8A:
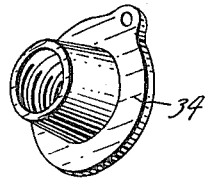
Figure 9:
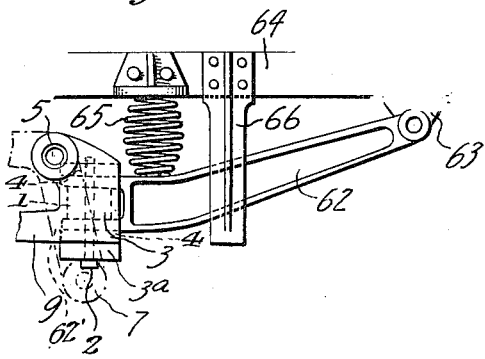

Referring to the annexed sheets of explanatory drawings:—Figure 1 is a view in perspective of one end of the front axle of a motor vehicle fitted with the improvements embodied in the present invention. Fig. 2 is a view in perspective of a modification of the invention as applied to the front axle of a vehicle. Fig. 3 is a view in sectional plan of part of Fig. 2 and is hereinafter described. Fig. 4 is a view in side elevation of the invention as applied to the rear axles of vehicles. Fig. 5 is a view in rear elevation, partly in section, of Fig. 4. Fig. 6 is a view in side elevation of a constructional detail of Fig. 4. Fig. 7 is a view in rear elevation of part of Fig. 6. Figs. 8 and 8$^a$ are views in perspective of parts of Fig. 4. Fig. 9 is a view in side elevation showing further modifications in the construction of the invention.

In these drawings like characters of reference have been employed to indicate similar or corresponding parts in the different views and the numeral 1 designates the near side end of a front axle of a motor car which axle may be of the type shown or of any other suitable design. The end of the axle 1 provides a bearing for a vertical bolt or pin 2 which pivotally supports a bracket 3 of approved construction. The bracket shown in Fig. 1 of the drawings has an inwardly projecting jaw 4 which fits over the end of the axle and is bored to accommodate the bolt or pin 2. If preferred, the jaw can be formed on the end of the axle and the bracket can be arranged to pivot in the said jaw. A boss or similar bearing 5 is formed on the upper portion of the bracket and through this boss is passed a stud or bolt 6 on which is pivotally mounted a strongly constructed bell-crank 7. The boss 5 preferably is located slightly in advance of the axle so that the lower end of the depending arm of the bell-crank 7 when inclined slightly rearwardly is in the same vertical plane as the pivot bolt or pin 2. The opposite arm of the bell-crank 7 projects forwardly and to its end is pivotally connected a depending rod 8 which passes through a slot or hole (not shown) in the end of an arm 9 projecting forwardly from the lower part of the bracket 3. A coiled compression spring 10 of any preferred shape is fitted around the said rod 8 between the forward end of the bell-crank 7 and the arm 9. The rod 8 passes through the arm 9 and is fitted on its lower end with a coiled spring 11 or other resilient buffer. The strength of the springs 10 and 11 can be adjusted by screwing up or unscrewing a nut 12 fitted to the lower end of the rod 8. The depending arm of the bell-crank 7 is formed with a boss 13 or bearing in which is rigidly secured in an approved way one end of an axle 14 of preferred construction for carrying a wheel (not shown).

The steering arm 15 can be keyed or otherwise secured to a boss 3ª formed on the lower part of the bracket 3, and is controlled by any suitable form of steering mechanism. If preferred, a stay 16 or the like can be fitted to the arm 9 and bracket 3 to prevent any lateral movement of the depending arm of the bell-crank 7.

The axle 1 can be provided with lugs 17 to which the ordinary semi-elliptic spring can be secured or the axle can be secured fixedly to the side members of the chassis or body of the vehicle in an approved way and the said semi-elliptic springs dispensed with.

In a modification of the invention (see Figs. 2 and 3) the bracket 3 may be made to partially surround the end of the axle to insure its having a requisite amount of strength to withstand the strains applied thereto. This construction of bracket also permits of its outer portion being made thin to allow the bell-crank 7 to be brought closer to the bolt or pin 2 and thereby give better steering control. The steering arm 15 can be attached to the bracket 3 in the ordinary way. The arm 9 projects forwardly from the boss 5 or from the top part of the bracket 3 so as to lie above the forwardly projecting arm of the bell-crank 7. The rod 8 pivoted to the forwardly projecting arm of the bell-crank 7 passes upwardly therefrom and passes through a slot or hole formed in the forward end of the arm 9. That part of the rod 8 that projects above the arm 9 is fitted with a strong compression spring 10 of approved form and the said spring bears at one end against the arm 9 and at the opposite end against a washer 65 and nut 12 fitted to the end of the rod 8. A spring 11 or resilient buffer can be fitted to the rod 8 between the arm 9 and bell-crank 7 as shown.

In the construction above described when the wheels strike an obstacle or enter a rut in the roadway they move backwardly and upwardly in the direction of the double pointed arrow and cause the spring 10 to be compressed and absorb shock or jar that would otherwise be transmitted to the body of the vehicle. The buffer spring 11 will take up any shock or jar incident to the rebound of the bell-crank 7 when the spring 10 forces it to its normal position thereby insuring the bell-crank having a perfect resilient bearing in both its backward and forward movement.

It will be readily understood that the angle of the bell-crank may vary considerably or that it may be made nearly straight by arranging the springs and fixed arm 9 to suit the alteration.

When the axle 1 is fitted to the chassis or body frame it can be formed in two parts of preferred length or the said axle can be dispensed with entirely and the bracket 3 can then be pivotally secured in an approved way to the chassis or body frame. Figs. 4 to 8ª illustrate a mode of applying the invention to the rear or driving axle of a motor car which axle is of the "live-axle" type. The outer end of the casing covering the axle is provided with a bearing 21 for the angle portion of a bell-crank 22 having a forwardly and a downwardly projecting arm. The bell-crank 22 is free to pivot on its bearing 21 and to the forwardly projecting arm is pivotally connected the lower end of a rod 23 which projects upwardly through a slot or hole in an arm 24 formed on a fixed part of the bearing 21. A strong compression spring 25 is carried on the upper end of the rod 23 and bears at its lower end against the arm 24 and at its upper end against an adjustable washer and nut 26 fitted to the end of the said rod. The spring 25 can be provided with an approved form of casing 27 to keep all dust and grit away from the same and this said casing can be arranged to pivot on a pin 27ª to permit of its accommodating itself to the position of the rod 23. The lower ends of the depending arm of the bell-cranks 22 are fitted with axles 28 of approved type for carrying the wheels. The hubs of the said wheels are fitted with sprockets 29 which are connected by chains 30 to driving sprockets 31 fitted to the projecting ends of the "live-axle" 32. The bearing 21 comprises a pair of flanged bosses 33 and 34 which can be screwed or otherwise connected to each other as shown in Fig. 5 of the drawings. A flattened projection 35 may extend inwardly from the flange of the inner boss 33 and lie between a semi-elliptic spring 36 and flanges 37 formed on the axle casing. The projection 35 is held securely by clamps 38 which retain the spring 36 in position and for additional security a flange 39 is formed on the said projection to bear against the inside of the spring 36. The outer periphery of the boss 34 is preferably tapered inwardly and the pivot part of the bell-crank 22 is retained between the flanges on the bosses. The two bosses 33 and 34 are retained in their relative positions by a bolt 40 or by any other suitable means or if preferred they can be secured in an approved way to the brake drum fitted to the axle. If preferred, a spring 41 or other resilient buffer device can be located between the arm 24 and the forwardly projecting arm on the bell-crank. A hand brake (not shown) can be arranged to operate on the hub of the wheel or on a drum fitted to the same or upon the axle 32. In an alternate construction the semi-elliptic spring 36 can be dispensed with and the axle can be secured revolubly in bearings fitted to the chassis. With this last mentioned construction the arm 24 can be extended outwardly and upwardly to be bolted to the said frame—see the dotted lines in Fig. 4. By extending the arm 24 as above described and affixing it to the chassis greater rigidity will be insured. In adapting the invention to motor cars having a chain drive the axle 32 is fixed as shown in Fig. 4 and the sprocket 31 is mounted revolubly on the end thereof. A second sprocket 41$^a$ indicated by dotted lines in the said figure is fitted to the sprocket 31 and the sprocket 41$^a$ is connected to a driving sprocket 42 by a chain 43 also shown in dotted lines. The tension on the driving chain 30 may be adjusted by operating a cam 44 to move the axle fitted to the lower end of the depending arm of the bell-crank. To permit of the axle being moved to adjust the tension of the chain the lower end of the depending arm of the bell-crank can be slotted or formed with a jaw 45 as shown in Fig. 6 of the drawings. The driving chain or chains 30 and 43 can be provided with an approved form of casing to protect them from dust or dirt and if preferred, they may be arranged to operate in an oil bath in the ordinary way.

Fig. 9 shows the mode of adapting beam 62 to the front axle and its rear end is pivotally affixed to a bracket 63 (part only of which is shown) that is fitted to the chassis frame 64. A strong compression spring 65 is placed between the chassis frame 64 and the beam 62 and a guide 66 or the like can be employed to prevent any lateral swing of the said beam. The guide 66 and spring 65 can be arranged in any convenient way and not necessarily as shown in the drawings. The said guide 66 can be fitted to the chassis frame 64 in any suitable way and means as antifrictional rollers can be employed to insure the beam moving freely therein while the beam can be provided with approved forms of stays or the like to give additional security to the same.

Any or all of the pivot points of the different parts of the invention can be fitted with oil-caps to insure their constant lubrication and freedom of movement.

The operation of the various constructions illustrated will be very easily understood from the foregoing specification and amplification of the description will not be required to put the invention into effective operation. Moreover, while I have described in the specification the construction of parts and operations preferred, I am aware that numerous changes of construction and operation may be made without departing from the spirit and scope of the invention, and I therefore, do not wish to be understood as limiting myself by the positive terms employed in connection with the description excepting such as the state of the art may require.

What I do claim is:—
1. A resilient suspension for vehicle bodies comprising in combination, a bracket mounted on the axle of said vehicle, a bell crank lever pivoted to and depending from said bracket, a wheel carrying axle mounted on the lower arm of said bell crank lever, a spring carrying member pivotally mounted on the upper arm of said bell crank lever, two opposing springs carried by said spring carrying member, and a stationary arm carried by said bracket and engaging each of said springs at their ends and adapted to oppose the pivotal movement of said bell crank lever.

2. A resilient suspension for vehicle bodies comprising in combination, an axle for the said vehicle, a bracket mounted on said axle, a bell crank lever pivoted to and depending from said bracket, a wheel carrying axle mounted on the lower arm of said bell crank lever, a spring carrying member pivotally mounted on the upper arm of said bell crank lever, two opposing springs carried by said spring carrying member, and a stationary arm carried by said bracket and engaging each of said springs at their adjacent ends whereby said springs oppose the pivotal movement of said bell crank lever, substantially as described.

3. A resilient suspension for vehicle bodies comprising in combination, an axle for the said vehicle, a bracket pivotally mounted on said axle, a bell crank lever pivoted to and depending from said bracket, a wheel carrying axle mounted on the lower arm of said bell crank lever, a spring carrying member pivotally mounted on the upper arm of said bell crank lever, two opposing springs carried by said spring carrying member, and a stationary arm carried by said bracket and engaging each of said springs at their adjacent ends whereby said springs oppose the pivotal movement of said bell crank lever with respect to said pivotal bracket, substantially as described.

In witness whereof I have signed this specification in the presence of two witnesses.

BERNARD JAMES EGAN.

Witnesses:
  WILLIAM A. ASHLOW,
  JAMES H. ANDERSON.